United States Patent
Blok et al.

(10) Patent No.: US 9,909,004 B2
(45) Date of Patent: *Mar. 6, 2018

(54) DICYCLOPENTADIENE BASED RESIN COMPOSITIONS AND ARTICLES MANUFACTURED THEREFROM

(71) Applicant: ExxonMobil Chemical Patents Inc., Baytown, TX (US)

(72) Inventors: Edward J. Blok, Wadsworth, OH (US); Anthony J. Dias, Houston, TX (US); Martin E. Levine, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/390,808

(22) PCT Filed: Feb. 19, 2013

(86) PCT No.: PCT/US2013/026676
§ 371 (c)(1),
(2) Date: Oct. 6, 2014

(87) PCT Pub. No.: WO2013/176712
PCT Pub. Date: Nov. 28, 2013

(65) Prior Publication Data
US 2015/0065655 A1 Mar. 5, 2015

Related U.S. Application Data

(60) Provisional application No. 61/651,756, filed on May 25, 2012.

(51) Int. Cl.
| | | |
|---|---|---|
| C08L 23/00 | (2006.01) |
| C08L 65/00 | (2006.01) |
| B60C 1/00 | (2006.01) |
| C08F 240/00 | (2006.01) |
| C08K 5/01 | (2006.01) |
| C08L 9/00 | (2006.01) |
| C08L 9/06 | (2006.01) |
| C08L 21/00 | (2006.01) |
| C08L 23/16 | (2006.01) |
| C08L 23/22 | (2006.01) |
| C08L 23/28 | (2006.01) |
| C08L 101/00 | (2006.01) |

(52) U.S. Cl.
CPC ............ *C08L 65/00* (2013.01); *B60C 1/0016* (2013.01); *B60C 1/0025* (2013.01); *C08F 240/00* (2013.01); *C08K 5/01* (2013.01); *C08L 9/00* (2013.01); *C08L 9/06* (2013.01); *C08L 21/00* (2013.01); *C08L 23/16* (2013.01); *C08L 23/22* (2013.01); *C08L 23/283* (2013.01); *C08L 101/00* (2013.01)

(58) Field of Classification Search
CPC ........................................................ C08L 65/00
See application file for complete search history.

(56) References Cited

U.S. PATENT DOCUMENTS

| | | | | |
|---|---|---|---|---|
| 3,927,144 A * | 12/1975 | Hayashi | ............... | B60C 1/0016 156/128.1 |
| 5,569,716 A * | 10/1996 | Okamoto | ................ | C08L 21/00 525/192 |
| 6,186,204 B1 | 2/2001 | Sasaka et al. | | |
| 6,201,059 B1 * | 3/2001 | Wideman | ............. | B60C 1/0016 152/450 |
| 6,242,550 B1 * | 6/2001 | Kralevich, Jr. | ........ | C08F 232/00 526/283 |
| 7,294,644 B2 | 11/2007 | Mayweg et al. | | |
| 8,476,352 B2 | 7/2013 | Rodgers et al. | | |
| 2001/0036558 A1 * | 11/2001 | Lewtas | ................... | B32B 27/32 428/521 |
| 2003/0040592 A1 | 2/2003 | Tajima et al. | | |
| 2004/0005834 A1 * | 1/2004 | Zhou | ................ | A61F 13/15593 442/328 |
| 2004/0092648 A1 * | 5/2004 | Jones | ...................... | C08K 5/01 524/502 |

FOREIGN PATENT DOCUMENTS

| | | |
|---|---|---|
| EP | 0 063 092 | 10/1982 |
| EP | 685521 | 12/1995 |
| EP | 0978533 | 2/2000 |
| EP | 1029873 | 8/2000 |
| JP | 2000344947 | 12/2000 |
| JP | 2010159316 | 7/2010 |
| JP | 2010533226 | 10/2010 |
| JP | 2011127006 | 6/2011 |
| WO | 2012/050658 | 4/2012 |
| WO | 2012/050666 | 4/2012 |

OTHER PUBLICATIONS

"The Vanderbilt Rubber Handbook", pp. 105-122, Ohm ed., R.T. Vanderbilt Col., Inc. 1990.
Kresge & Wan "Kirk Othmer Encyclopedia of Chemical Technology", p. 934-955, John Wiley & Sons 4th ed. 1993.

* cited by examiner

*Primary Examiner* — Irina Krylova
(74) *Attorney, Agent, or Firm* — Priya G. Prasad

(57) ABSTRACT

A composition including at least one elastomer, and a hydrocarbon polymer additive having a dicyclopentadiene, cyclopentadiene, and methylcyclopentadiene derived content of about 40 wt % to about 80 wt % of the total weight of the hydrocarbon polymer additive, a weight average molecular weight of about 100 g/mole to about 800 g/mole, and a softening point of about 110° C. to about 150° C. as determined in accordance with ASTM D6090.

6 Claims, No Drawings

DICYCLOPENTADIENE BASED RESIN COMPOSITIONS AND ARTICLES MANUFACTURED THEREFROM

CROSS REFERENCE TO RELATED APPLICATIONS

This application is a National Stage Application of International Application No. PCT/US2013/026676, filed Feb. 19, 2013. This application claims the benefit of prior U.S. application Ser. No. 61/651,756, filed May 25, 2012, the disclosures of which are incorporated herein by reference in their entirety.

FIELD OF INVENTION

The invention relates to a dicyclopentadiene based resin composition that includes an elastomer and a hydrocarbon polymer additive having dicyclopentadiene, cyclopentadiene and methylcyclopentadiene derived content. The invention further relates to articles manufactured from such dicyclopentadiene based resin compositions.

BACKGROUND

Elastomeric compositions having a combination of performance properties, such as high wet traction and low rolling resistance, are generally sought for tire and other applications. Unfortunately, hydrocarbon resins that are added to the elastomer to improve wet traction can have a negative effect on rolling resistance and vice versa. What is desired, therefore, is a resin that can increase the wet traction performance of the composition while maintaining or decreasing the rolling resistance and/or a resin that can provide an improved balance of wet traction and roll resistance properties.

SUMMARY

In one aspect, a composition is provided. The composition includes at least one elastomer, and a hydrocarbon polymer additive having a dicyclopentadiene, cyclopentadiene, and methylcyclopentadiene derived content of about 40 wt % to about 80 wt % of the total weight of the hydrocarbon polymer additive, a weight average molecular weight of about 100 g/mole to about 800 g/mole, and a softening point of about 110° C to about 150° C as determined in accordance with ASTM D6090.

In another aspect, a tire is provided. The tire includes a composition comprising at least one elastomer, and a hydrocarbon polymer additive having a dicyclopentadiene, cyclopentadiene, and methylcyclopentadiene derived content of about 40 wt % to about 80 wt % of the total weight of the hydrocarbon polymer additive, a weight average molecular weight of about 100 g/mole to about 800 g/mole, and a softening point of about 110° C to about 150° C as determined in accordance with ASTM D6090.

In yet another aspect, a tire tread is provided. The tire tread includes a composition comprising at least one elastomer, and a hydrocarbon polymer additive having a dicyclopentadiene, cyclopentadiene, and methylcyclopentadiene derived content of about 40 wt % to about 80 wt % of the total weight of the hydrocarbon polymer additive, a weight average molecular weight of about 100 g/mole to about 800 g/mole, and a softening point of about 110° C. to about 150° C. as determined in accordance with ASTM D6090.

DETAILED DESCRIPTION

It has been discovered that certain dicyclopentadiene, cyclopentadiene, and methylcyclopentadiene based hydrocarbon polymer additives impart a unique and desirable combination of advantageous properties to elastomeric compositions, such as improved wet traction and reduced rolling resistance. For example, it has been discovered that a particularly advantageous combination of wet traction and rolling resistance performance can be achieved by using a hydrocarbon polymer additive that is has a dicyclopentadiene, cyclopentadiene, and methylcyclopentadiene content of 40 to 80% by weight of the total weight of the hydrocarbon polymer additive and has a low molecular weight in the range of 100 to 800 g/mole and a high softening point in the range of 110 to 150° C.

As used herein, the term "dicyclopentadiene, cyclopentadiene, and methylcyclopentadiene derived content" refers to the aggregate content of the referenced monomer components producing the polymer. The term is not intended to require or imply that each of the referenced components is present in the polymer or that the polymer is derived from all of the referenced components. In any embodiment of the present invention, one or two of the referenced components may be absent or present in only minimal amounts.

The cured compositions comprising the hydrocarbon polymer additive may have an advantageous combination of wet traction and rolling resistance performance properties.

Elastomers

In any embodiment, the composition comprises at least one elastomer. Typical elastomers that may be included in the compositions include butyl rubber, branched ("star-branched") butyl rubber, star-branched polyisobutylene rubber, random copolymers of isobutylene and para-methylstyrene(poly(isobutylene-co-p-methylstyrene)), poly butadiene rubber ("BR"), high cis-polybutadiene, polyisoprene rubber, isoprene-butadiene rubber ("IBR"), styrene-isoprene-butadiene rubber ("SIBR"), styrene-butadiene rubber (SBR), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, and any halogenated versions of these elastomers and mixtures thereof. Useful elastomers can be made by any suitable means known in the art, and the invention is not herein limited by the method of producing the elastomer.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene.

In any embodiment, the composition may comprise a blend of two or more elastomers. Blends of elastomers may be reactor blends and/or melt mixes. The individual elastomer components may be present in various conventional amounts, with the total elastomer content in the composition being expressed as 100 phr in the formulation.

Particularly useful elastomers include isobutylene-based homopolymers or copolymers. An isobutylene based elastomer refers to an elastomer or polymer comprising at least 70 mol % repeat units from isobutylene. These polymers can be described as random copolymers of a C4 to C7 isomonoolefin derived unit, such as an isobutylene derived unit, and at least one other polymerizable unit. The isobutylene-based elastomer may or may not be halogenated.

In any embodiment, the elastomer may be a butyl-type rubber or branched butyl-type rubber, including halogenated versions of these elastomers. Particularly useful elastomers are unsaturated butyl rubbers such as homopolymers and copolymers of olefins, isoolefins and multiolefins. These and other types of useful butyl rubbers are well known and are described in RUBBER TECHNOLOGY, p. 209-581 (Morton, ed., Chapman & Hall 1995), THE VANDERBILT RUBBER HANDBOOK, p. 105-122 (Ohm ed., R.T. Vanderbilt Col., Inc. 1990), and Kresge and Wang in 8 KIRK-OTHMER ENCYCLOPEDIA OF CHEMICAL TECHNOLOGY, p. 934-955 (John Wiley & Sons, Inc. 4th ed. 1993), each of which are incorporated herein by reference. Non-limiting examples of other useful unsaturated elastomers are poly(isobutylene-co-isoprene), polyisoprene, polybutadiene, polyisobutylene, poly(styrene-co-butadiene), natural rubber, star-branched butyl rubber, and mixtures thereof.

In any embodiment, the elastomer may comprise at least one non isobutylene based rubber of types conventionally used in tire rubber compounding, and herein referred to as "general purpose rubber." A general purpose rubber may be any rubber that usually provides high strength and good abrasion along with low hysteresis and high resilience. These elastomers may require antidegradants in the mixed compound if they have poor resistance to both heat and ozone. Examples of general purpose rubbers include natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof.

In any embodiment, the elastomeric composition may also comprise rubbers of ethylene and propylene derived units such as ethylene-propylene rubber ("EP") and ethylene-propylene-diene rubber ("EPDM"), and their mixtures. EP and EPDM are may also be considered to be general purpose elastomers. Examples of suitable termonomers in making EPDM are ethylidene norbornene, 1,4-hexadiene, dicyclopentadiene, as well as others.

In any embodiment, the elastomer may include a polybutadiene (BR) rubber. The Mooney viscosity of the polybutadiene rubber as measured at 100° C. (ML 1+4, ASTM D1646) may range from 35 to 70, or from 40 to about 65, or in another embodiment from 45 to 60.

In any embodiment, the elastomer may include a synthetic rubber, such as high cis-polybutadiene ("cis-BR"). By "cis-polybutadiene" or "high cis-polybutadiene", it is meant that 1,4-cis polybutadiene is used, wherein the amount of the cis component is at least 95%.

In any embodiment, the elastomer may comprise a polyisoprene (IR) rubber. The Mooney viscosity of the polyisoprene rubber as measured at 100° C. (ML 1+4, ASTM DI1646) may range from 35 to 70, or from 40 to about 65, or in another embodiment from 45 to 60.

In any embodiment, the elastomer may comprise a natural rubber. Natural rubbers are described in detail by Subramaniam in RUBBER TECHNOLOGY, p 179-208 (Morton, ed., Chapman & Hall, 1995), herein incorporated by reference. Particularly desirable embodiments of the natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) of from 30 to 120, or more preferably from 40 to 80.

The elastomers useful in the invention can be blended with various other rubbers or plastics, in particular thermoplastic resins such as nylons or polyolefins such as polypropylene or copolymers of polypropylene. These compositions are useful in air barriers such as bladders, tire innertubes, tire innerliners, air sleeves (such as in air shocks), diaphragms, as well as other applications where high air or oxygen retention is desirable.

In any embodiment, the elastomer may comprise a styrene rubber such as styrene butadiene rubber ("SBR") such as emulsion-SBR ("E-SBR"), solution SBR (S-SBR), high styrene rubber ("HSR") and the like. Desirable embodiments of the SBRs may have a styrene content from 10 to 60 wt %, such as E-SBR elastomers available from JSR Corporation, which include JSR 1500 (25 wt % styrene), JSR 1502 (25 wt % styrene), JSR 1503 (25 wt % styrene), JSR 1507 (25 wt % styrene), JSR 0202 (45 wt % styrene), JSR SL552 (25 wt % styrene), JSR SL574 (15 wt % styrene), JSR SL563 (20 wt % styrene), JSR 0051, JSR 0061, or the like. Preferred SBRs have a Mooney viscosity at 100° C. (ML 1+4, ASTM D1646) of from 30 to 120, or more preferably from 40 to 80.

Other useful elastomers, including functionalized elastomers, are described in U.S. Pat. No. 7,294,644, which is hereby incorporated herein by reference in its entirety for all jurisdictions where permitted. The elastomers useful in the invention can be blended with various other rubbers or plastics, in particular thermoplastic resins such as nylons or polyolefins such as polypropylene or copolymers of polypropylene. These compositions are useful in air barriers such as bladders, tire inner tubes, tire innerliners, air sleeves (such as in air shocks), diaphragms, as well as other applications where high air or oxygen retention is desirable.

Hydrocarbon Polymer Additive

The composition also includes a hydrocarbon polymer additive. The hydrocarbon polymer additive has a dicyclopentadiene, cyclopentadiene, and methylcyclopentadiene derived content of 40 to 80 wt % of the total weight of the hydrocarbon polymer additive. In any embodiment, the hydrocarbon polymer additive may have a dicyclopentadiene, cyclopentadiene, and methylcyclopentadiene derived content of 50 to 80 wt %, or 60 to 80 wt %, or 70 to 80 wt % of the total weight of the hydrocarbon polymer additive. In any embodiment, the hydrocarbon polymer additive may be a hydrocarbon resin that includes, in predominant part, dicyclopentadiene derived units. The term "dicyclopentadiene derived units", "dicyclopentadiene derived content", and the like refers to the dicyclopentadiene monomer used to form the polymer, i.e., the unreacted chemical compound in the form prior to polymerization, and can also refer to the monomer after it has been incorporated into the polymer, which by virtue of the polymerization reaction typically has fewer hydrogen atoms than it does prior to the polymerization reaction.

In any embodiment, the hydrocarbon polymer additive may have a dicyclopentadiene derived content of about 50 wt % to about 80 wt % of the total weight of the hydrocarbon polymer additive, more preferably about 60 wt % to about 80 wt % of the total weight of the hydrocarbon polymer additive, even more preferably about 70 wt % to about 80 wt % of the total weight of the hydrocarbon polymer additive. Accordingly, in any embodiment, the hydrocarbon polymer additive may have a dicyclopentadiene derived content of about 50% or more, or about 55% or more, or about 60% or more, or about 65% or more, or about 70% or more of the total weight of the hydrocarbon polymer additive.

In any embodiment, the hydrocarbon polymer additive may have a weight average molecular weight of about 100 g/mole to about 800 g/mole, or about 100 g/mole to about 700 g/mole, or about 100 g/mole to about 600 g/mole, or about 200 g/mole to about 800 g/mole, or about 200 g/mole to about 700 g/mole, or about 200 g/mole to about 600 g/mole. In any embodiment, the hydrocarbon polymer additive may have a weight average molecular weight of about 300 g/mole to about 500 g/mole, or most preferably about 400 g/mole. Accordingly, in any embodiment, the hydrocarbon polymer additive may have a weight average molecular weight of about 100 g/mole or more, or about 130 g/mole or more, or about 150 g/mole or more, or about 200 g/mole or more, or about 250 g/mole or more, or about 300 g/mole or more, or about 350 g/mole or more. Furthermore, in any embodiment, the hydrocarbon polymer additive may have a weight average molecular weight of about 800 g/mole or less, or about 750 g/mole or less, or about 700 g/mole or less, or about 650 g/mole or less, or about 600 g/mole or less, or about 550 g/mole or less, or about 500 g/mole or less, or about 450 g/mole or less at the upper end of the range.

In any embodiment, the hydrocarbon polymer additive may have a ring and ball softening point, as determined ASTM D6090, of about 100° C. to about 160° C., or about 110° C. to about 150° C., or about 110° C. to about 140° C., or about 115° C. to about 140° C., or about 120° C. to about 140° C.

In any embodiment, the hydrocarbon polymer additive may further include aromatic and nonaromatic hydrocarbon components. Differences in the hydrocarbon polymer additives are largely due to the olefins in the feedstock from which the hydrocarbon components are derived. In any embodiment, the hydrocarbon polymer additive may contain "aliphatic" hydrocarbon components which have a hydrocarbon chain formed from C4-C6 fractions containing variable quantities of piperylene, isoprene, mono-olefins, and non-polymerizable paraffinic compounds. The hydrocarbon polymer additive may also contain "aromatic" hydrocarbon structures having polymeric chains which are formed of aromatic units, such as styrene, xylene, α-methylstyrene, vinyl toluene, and indene.

In any embodiment, the hydrocarbon polymer additive used in rubber compounding includes olefins such as piperylene, isoprene, amylenes, and cyclic components. The hydrocarbon polymer additive may also contain aromatic olefins such as styrenic components and indenic components.

Piperylenes are generally a distillate cut or synthetic mixture of C5 diolefins, which include, but are not limited to, cis-1,3-pentadiene, trans-1,3-pentadiene, and mixed 1,3-pentadiene. In general, piperylenes do not include branched C5 diolefins such as isoprene.

Cyclics are generally a distillate cut or synthetic mixture of C5 and C6 cyclic olefins, diolefins, and dimers therefrom. Cyclics include, but are not limited to, cyclopentene, cyclopentadiene, dicyclopentadiene, cyclohexene, 1,3-cyclohexadiene, and 1,4-cyclohexadiene. The dicyclopentadiene may be in either the endo or exo form. The cyclics may or may not be substituted. Preferred substituted cyclics include cyclopentadienes and dicyclopentadienes substituted with a C1 to C40 linear, branched, or cyclic alkyl group, preferably one or more methyl groups.

Preferred aromatics that may be in the hydrocarbon polymer additive include one or more of styrene, indene, derivatives of styrene, and derivatives of indene. Particularly preferred aromatic olefins include styrene, alpha-methylstyrene, beta-methylstyrene, indene, and methylindenes, and vinyl toluenes.

Styrenic components include styrene, derivatives of styrene, and substituted sytrenes. In general, styrenic components do not include fused-rings, such as indenics.

The resins described above may be produced by methods generally known in the art for the production of hydrocarbon polymer additives, and the invention is not limited by the method of forming the hydrocarbon polymer additive. In any embodiment, the hydrocarbon polymer additive may be produced by a thermal polymerization reaction. In any embodiment, the hydrocarbon polymer additive is produced by combining the olefin feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized for this invention may be batchwise or continuous mode. Continuous polymerization may be accomplished in a single stage or in multiple stages.

In any embodiment, the hydrocarbon polymer additive may be hydrogenated. The hydrogenation of the hydrocarbon polymer additive may be carried out by any method known in the art, and the invention is not limited by the method of hydrogenation. For example, the hydrogenation of the hydrocarbon polymer additive may be either a batchwise or a continuous process. Preferably the hydrocarbon polymer additive is catalytically hydrogenated. Catalysts employed for the hydrogenation of hydrocarbon polymer additives are typically supported monometallic and bimetallic catalyst systems based on elements from Group 6, 8, 9, 10, or 11 of the Periodic Table of Elements.

Fillers and Additives

In any embodiment, the composition may contain other components and additives customarily used in rubber compounds, such as effective amounts of other processing aids, pigments, accelerators, cross-linking and curing materials, antioxidants, antiozonants, fillers, and/or clays. In any embodiment, the elastomeric compositions may include other useful processing aids such as, for example, plastomers, polybutene, or mixtures thereof.

In any embodiment, the composition may also comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically range, for example in the tire industry, from about 0.0001 µm to about 100 µm.

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

In any embodiment, the composition may also include clay. The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. In any embodiment, the filler may be a layered clay, optionally, treated or pre-treated with a modifying agent such as organic molecules; the layered clay may comprise at least one silicate.

The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are synthetically prepared smectite-clays.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminate oxides, hydrotalcite, and the like. Combinations of any of the above discussed silicates are also contemplated.

The layered filler such as the layered clays described above may be modified such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be added as an additive to the composition at any stage; for example, the additive may be added to the elastomer, followed by addition of the layered filler, or may be added to a combination of at least one elastomer and at least one layered filler, or the additive may be first blended with the layered filler, followed by addition of the elastomer in yet another embodiment.

In any embodiment, one or more silane coupling agents may be used in the composition. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and the like, and mixtures thereof.

In any embodiment, the filler may be carbon black or modified carbon black. The filler may also be a blend of carbon black and silica. In any embodiment, the elastomeric composition may be a tire tread or sidewall and comprises reinforcing grade carbon black at a level of from 10 to 100 phr of the blend, more preferably from 30 to 80 phr in another embodiment, or from 50 to 80 phr. Useful grades of carbon black include the ranges of from N110 to N990.

Crosslinking Agents, Curatives, Cure Packages, and Curing Processes

The compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends may be crosslinked to improve the polymer's mechanical properties. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C., or from 150° C. to 200° C. for about 1 to 150 minutes.

Halogen-containing elastomers may be crosslinked by their reaction with metal oxides. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof.

Sulfur is the most common chemical vulcanizing agent for diene-containing elastomers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-tertiarybutyl-2-benzothiazole sulfenamide (TBBS), N-cyclohexyl-2-benzothiazole-sulfenamide (CBS), and thioureas.

In any embodiment, at least one curing agent(s) may be present from 0.2 to 10 phr, or from 0.5 to 5 phr, or from 0.75 phr to 2 phr.

Processing

In any embodiment, the composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage (s). The elastomers, polymer additives, silica and silica coupler, and carbon black, if used, are generally mixed in one or more non-productive mix stages. The terms "non-productive" and "productive" mix stages are well known to those having skill in the rubber mixing art.

In any embodiment, the carbon black may be added in a different stage from zinc oxide and other cure activators and accelerators. In any embodiment, antioxidants, antiozonants, and processing materials may be added in a stage after the carbon black has been processed with the elastomers, and zinc oxide is added at a final stage to maximize the compound modulus. In any embodiment, mixing with the clays may be performed by techniques known to those skilled in the art, wherein the clay is added to the polymer at the same time as the carbon black. In any embodiment, additional stages may involve incremental additions of one or more fillers.

In any embodiment, mixing of the components may be carried out by combining the elastomer components, filler and clay in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C., or from 100° C. to 200° C. Mixing should generally be conducted under conditions of shear sufficient to allow the clay to exfoliate and become uniformly dispersed within the elastomer(s).

In any embodiment, from 70% to 100% of the elastomer or elastomers may be first mixed for 20 to 90 seconds, or until the temperature reaches from 40° C. to 75° C. Then, approximately 75% of the filler, and the remaining amount of elastomer, if any, may be added to the mixer, and mixing continues until the temperature reaches from 90° C. to 150° C. Next, the remaining filler may be added, as well as the processing aids, and mixing continues until the temperature reaches from 140° C. to 190° C. The masterbatch mixture may be then finished by sheeting on an open mill and allowed to cool, for example, to from 60° C. to 100° C. when curatives may be added.

In any embodiment, the elastomer may be blended with a hydrocarbon polymer additive, wherein the hydrocarbon polymer additive has a dicyclopentadiene, cyclopentadiene, and methylcyclopentadiene derived content of about 40 wt % to about 80 wt % of the total weight of the hydrocarbon polymer additive. In any embodiment, the elastomer may be blended with a hydrocarbon polymer additive that has a weight average molecular weight of about 100 g/mole to about 800 g/mole, and a softening point of about 110° C. to about 150° C. as determined in accordance with ASTM D6090.

INDUSTRIAL APPLICABILITY

The compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the compositions are useful in articles for a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The compositions may either be fabricated into a finished article or a component of a finished article such as an innerliner for a tire. The article may be selected from air barriers, air membranes, films, layers (microlayers and/or multilayers), innerliners, innertubes, air sleeves, sidewalls, treads, tire curing bladders, and the like. The elastomeric composition may be particularly useful in a tire tread.

The compositions of the present invention are useful in a variety of applications, particularly pneumatic tire components, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes. They are also useful as plasticizers in rubber formulations; as components to compositions that are manufactured into stretch-wrap films; as dispersants for lubricants; and in potting and electrical cable filling and cable housing materials.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

EXAMPLE

In the following example:

"PR 373" is a hydrocarbon polymer additive available from ExxonMobil Chemical Company as Oppera™ 373. It has a softening point of 89° C., a weight average molecular weight of about 1500 g/mole, and a dicyclopentadiene/cyclopentadiene/methylcyclopentadiene content of less than 40 wt %.

"E5400" is a hydrocarbon polymer additive available from ExxonMobil Chemical Company as Escorez™ 5400. It has a softening point of 103° C., a weight average molecular weight of about 400 g/mole, and a dicyclopentadiene/cyclopentadiene/methylcyclopentadiene content of 40-80 wt %.

"E5415" is a hydrocarbon polymer additive available from ExxonMobil Chemical Company as Escorez™ 5415. It has a softening point of 118° C., a weight average molecular weight of about 430 g/mole, and a dicyclopentadiene/cyclopentadiene/methylcyclopentadiene content of 40-80 wt %.

"E5340" is a hydrocarbon polymer additive available from ExxonMobil Chemical Company as Escorez™ 5340. It has a softening point of 140° C., a weight average molecular weight of about 460 g/mole, and a dicyclopentadiene/cyclopentadiene/methylcyclopentadiene content of 40-80 wt %.

"E5600" is a hydrocarbon polymer additive available from ExxonMobil Chemical Company as Escorez™ 5600. It has a softening point of 103° C., a weight average molecular weight of about 520 g/mole, and a dicyclopentadiene/cyclopentadiene/methylcyclopentadiene content of 40-80 wt %.

"E5615" is a hydrocarbon polymer additive available from ExxonMobil Chemical Company as Escorez™ 5615. It has a softening point of 118° C., a weight average molecular weight of about 500 g/mole, and a dicyclopentadiene/cyclopentadiene/methylcyclopentadiene content of 40-80 wt %.

"Naph" is naphthenic oil.

"Rolling Resistance" was estimated by comparing tan delta values at 60° C., and 5 Hz on the return strain of the second strain (@14%) using an Advanced Polymer Analyzer 2000 (Alpha Technologies) according to ASTM D7605. Lower values suggest better/lower rolling resistance.

"Wet traction" was estimated by comparing tan delta values at 0° C. and 10 Hz at 3% strain from the second strain by performing a strain sweep using an ARES strain-controlled rheometer according to ASTM D5270-01. Higher values suggest better wet traction values.

"Payne effect" is determined by subtracting G'@45% (kPa) from G' A 0.5% (kPa).

In Table 1, each of the samples comprise a silica tread comprising the resin at a concentration of 12 phr and the oil at a concentration of 10 phr.

The composition of Paragraph [0076], wherein the weight average molecular weight of the hydrocarbon polymer additive is about 200 g/mole to about 600 g/mole.

The composition of Paragraph [0077], wherein the weight average molecular weight of the hydrocarbon polymer additive is about 300 g/mole to about 500 g/mole.

The composition of Paragraphs [0076] to [0078], wherein the softening point of the hydrocarbon polymer additive is about 110° C. to about 140° C.

The composition of Paragraph [0079], wherein the softening point of the hydrocarbon polymer additive is about 115° C. to about 140° C.

The composition of any of Paragraphs [0076] to [0080], wherein the hydrocarbon polymer additive has a dicyclopentadiene, cyclopentadiene, and methylcyclopendtadiene derived content of about 60 wt % to about 100 wt % of the total weight of the hydrocarbon polymer additive.

The composition of Paragraph [0081], wherein the hydrocarbon polymer additive has a dicyclopentadiene, cyclopentadiene, and methylcyclopendtadiene derived content of about 70 wt % to about 90 wt % of the total weight of the hydrocarbon polymer additive.

TABLE I

| Resin | PR 373 | E5400 | E5415 | E5340 | E5600 | E5615 |
|---|---|---|---|---|---|---|
| Oil | Naph | Naph | Naph | Naph | Naph | Naph |
| S.P. of resin (° C.) | 90 | 103 | 120 | 140 | 103 | 120 |
| Advanced Polymer Analyzer 2000 Data | | | | | | |
| G" @ 3.00% peak value (kPa) | 1096 | 1077 | 1090 | 1074 | 1034 | 1065 |
| G' @ 0.50% (kPa) | 12157 | 12557 | 12644 | 12255 | 11780 | 12056 |
| G' @ 45% (kPa) | 1577 | 1624 | 1656 | 1676 | 1562 | 1580 |
| Payne effect | 10580 | 10933 | 10988 | 10629 | 10218 | 10476 |
| Rolling Resistance | 0.209 | 0.204 | 0.203 | 0.204 | 0.205 | 0.206 |
| Wet Traction Data | | | | | | |
| tan delta @ -15° C. | 0.637 | 0.642 | 0.649 | 0.656 | 0.668 | 0.672 |
| tan delta 0° C. | 0.428 | 0.415 | 0.429 | 0.444 | 0.442 | 0.45 |
| tan delta 10° C. | 0.318 | 0.306 | 0.314 | 0.326 | 0.322 | 0.331 |
| tan delta 25° C. | 0.229 | 0.221 | 0.222 | 0.23 | 0.227 | 0.231 |
| G' (Pa) (-15° C.) | 7.1E+07 | 6.8E+07 | 7.1E+07 | 7.1E+07 | 7.4E+07 | 7.6E+07 |
| G' (Pa) (0° C.) | 3.3E+07 | 3.2E+07 | 3.4E+07 | 3.3E+07 | 3.3E+07 | 3.4E+07 |
| G' (Pa) (10° C.) | 2.5E+07 | 2.4E+07 | 2.5E+07 | 2.5E+07 | 2.5E+07 | 2.5E+07 |
| G' (Pa) (25° C.) | 2.0E+07 | 1.9E+07 | 2.0E+07 | 1.9E+00 | 2.0E+07 | 1.9E+00 |
| Physical Properties, ISO37, British Std. dics type 2 | | | | | | |
| Modulus @ 100%, psi | 400 | 475 | 418 | 482 | 469 | 442 |
| Modulus @ 300%, psi | 1188 | 1458 | 1366 | 1453 | 1464 | 1407 |
| Ultimate Tensile Strength, psi | 1565 | 1596 | 1699 | 1779 | 1602 | 1703 |
| Ultimate Elongation, % | 343 | 323 | 355 | 340 | 328 | 353 |

As illustrated in Table I, Sample E5340, E5600 and E5615 exhibited improved wet traction at all tested temperatures relative to PR 373, while also exhibiting improved rolling resistance. E5415 also exhibited improved rolling resistance with equivalent wet traction. Sample E5415 exhibited the most improvement in rolling resistance and exhibited improved wet traction at 0° C. relative to PR 373. E5615 exhibited the best wet traction.

The invention may also be better understood in relation to the following embodiments:

A composition comprising: at least one elastomer, and a hydrocarbon polymer additive having a dicyclopentadiene, cyclopentadiene, and methylcyclopendtadiene derived content of about 40 wt % to about 80 wt % of the total weight of the hydrocarbon polymer additive, a weight average molecular weight of about 100 g/mole to about 800 g/mole, and a softening point of about 110° C. to about 150° C. as determined in accordance with ASTM D6090.

The composition of Paragraphs [0076] to [0084], wherein the composition is a cured composition.

The composition of any of Paragraphs [0076] to [0083], wherein the elastomer is present in the composition in a range of about 33 wt % to about 75 wt % based on the total weight of the composition.

The composition of any of Paragraphs [0076] to [0084], wherein the hydrocarbon polymer additive is present in the composition in a range of about 3 wt % to about 10 wt % based on the total weight of the composition.

A tire comprising the composition of any of Paragraphs [0076] to [0085].

A tire tread comprising the composition of any of Paragraphs [0076] to [0085].

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A tire tread comprising a composition comprising:
   about 33 wt % to about 75 wt % of at least one elastomer, and
   about 3 wt % to about 10 wt % of a hydrocarbon polymer additive comprising all three of a dicyclopentadiene, cyclopentadiene, and methylcyclopentadiene derived aggregate content of about 40 wt % to about 80 wt % of the total weight of the hydrocarbon polymer additive, a weight average molecular weight of about 100 g/mole to about 800 g/mole, and a softening point of about 110° C. to about 140° C. as determined in accordance with ASTM D6090; and
   wherein the tire tread has a tan delta at 60° C. of 0.206 to 0.203;
   a tan delta at −15° C. of 0.642 to 0.672 and a modulus at 300% of 1366 to 1464 psi.

2. The tire tread of claim 1, wherein the weight average molecular weight of the hydrocarbon polymer additive is about 200 g/mole to about 600 g/mole.

3. The tire tread of claim 1, wherein the softening point of the hydrocarbon polymer additive is about 115° C. to about 140° C.

4. The tire tread of claim 1, wherein the hydrocarbon polymer additive further comprises one or more aromatic hydrocarbon components.

5. The tire tread of claim 4, wherein the one or more aromatic hydrocarbon components comprises one or more of styrene, alpha-methylstyrene, beta-methylstyrene, indene, methylindenes, and vinyl toluenes.

6. The tire tread of claim 1, wherein the weight average molecular weight of the hydrocarbon polymer additive ranges from greater than about 400 g/mol to about 800 g/mole, and wherein the tire tread has a tan delta at 0° C. of 0.429 to 0.45.

* * * * *